(12) United States Patent
Fujibayashi

(10) Patent No.: US 7,861,054 B2
(45) Date of Patent: Dec. 28, 2010

(54) METHOD AND SYSTEM FOR CONTROLLING INFORMATION OF LOGICAL DIVISION IN A STORAGE CONTROLLER

(75) Inventor: Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 38 days.

(21) Appl. No.: 10/978,486

(22) Filed: Nov. 2, 2004

(65) Prior Publication Data

US 2006/0059307 A1    Mar. 16, 2006

(30) Foreign Application Priority Data

Sep. 13, 2004   (JP) ............................ 2004-265764

(51) Int. Cl.
*G06F 13/14* (2006.01)

(52) U.S. Cl. ............... 711/170; 711/114; 711/162; 711/173; 714/6; 709/223; 709/225

(58) Field of Classification Search ........... 711/112, 711/114, 162, 170, 173; 710/105; 714/6; 455/410; 709/223, 225
See application file for complete search history.

(56) References Cited

U.S. PATENT DOCUMENTS

| | | | | |
|---|---|---|---|---|
| 5,680,580 A | * | 10/1997 | Beardsley et al. ............ | 714/6 |
| 5,784,703 A | * | 7/1998 | Muraoka et al. ............ | 711/173 |
| 6,256,749 B1 | * | 7/2001 | Kakuta et al. ............... | 714/6 |
| 6,484,173 B1 | | 11/2002 | O'Hre et al. | |
| 6,578,120 B1 | * | 6/2003 | Crockett et al. ............ | 711/162 |
| 6,684,209 B1 | | 1/2004 | Ito et al. | |
| 7,028,137 B2 | * | 4/2006 | Nashimoto et al. .......... | 711/112 |
| 7,047,388 B2 | * | 5/2006 | Kaneko ..................... | 711/170 |
| 7,054,968 B2 | * | 5/2006 | Shrader et al. ............. | 710/105 |
| 7,065,611 B2 | * | 6/2006 | Kano ......................... | 711/114 |
| 7,103,712 B2 | * | 9/2006 | Mizuno ..................... | 711/112 |
| 7,152,146 B2 | * | 12/2006 | Satoyama et al. .......... | 711/162 |
| 2002/0087696 A1 | * | 7/2002 | Byrnes ...................... | 709/226 |
| 2002/0103969 A1 | | 8/2002 | Koizumi et al. | |
| 2002/0143903 A1 | | 10/2002 | Uratani et al. | |
| 2003/0229689 A1 | * | 12/2003 | Raghavan et al. .......... | 709/223 |
| 2003/0236884 A1 | * | 12/2003 | Yamamoto et al. ......... | 709/225 |
| 2004/0043755 A1 | * | 3/2004 | Shimooka et al. .......... | 455/410 |

FOREIGN PATENT DOCUMENTS

| | | |
|---|---|---|
| JP | 2001-265655 A | 9/2001 |
| JP | 2002-182859 A | 6/2002 |
| JP | 2002-288108A) | 10/2002 |
| WO | WO 03/027856 | 4/2003 |
| WO | WO 2004/015522 A2 | 2/2004 |

\* cited by examiner

*Primary Examiner*—Yong Choe
(74) *Attorney, Agent, or Firm*—Antonelli, Terry, Stout & Kraus, LLP.

(57) ABSTRACT

A storage controller is realized in which validity/invalidity of functions is settable in a unit of logical division in conformity with logical division of logical groups control is performed such that operation has the influence upon only the inside of a range defined by resource groups of logical division and an Inband I/F for accessing functions is made to match with the logical division. Further, access control cooperative with information on the user side (information of server, user and application) is realized by causing a management server to manage information in the storage controller and user information.

12 Claims, 17 Drawing Sheets

FIG. 6

| # | VOL ID | LUN | VOL GROUP ID | CHANNEL ID | GROUP ID | HOST GROUP ID |
|---|---|---|---|---|---|---|
| 0 | 0 | 0 | 000 | 0 | 0 | 0 |
| 1 | 1 | 0 | 000 | 0 | 0 | 1 |
| 2 | 2 | 0 | 000 | 1 | 0 | 2 |
| 3 | 3 | 1 | 000 | 1 | 0 | 2 |
| 4 | 4 | 2 | 000 | 1 | 0 | 2 |
| 5 | 5 | 0 | 001 | 2 | 1 | 3 |
| 6 | 6 | 0 | 001 | 2 | 1 | 4 |

| # | MP ID | MP PROCESS TIME, ALLOTMENT RATE (%) | OBJECT VOL GRP ID |
|---|---|---|---|
| 0 | 00 | 100 | 000 |
| 1 | 01 | 100 | 000 |
| 2 | 02 | 100 | 000 |
| 3 | 03 | 70 | 001 |
| 4 | 03 | 30 | 002 |

| # | STORAGE ID | GRP ID | INBAND SYSTEM I/F ID | HOST ID (SERVER) | USER ID |
|---|---|---|---|---|---|
| 0 | 20024 | 000 | 00-00 | tama | aka |
| 1 | 20024 | 000 | 00-01 | neko | ao |
| 2 | 20024 | 001 | 00-02 | mike | ki |
| 3 | 20024 | 002 | 00-03 | heath | mido |
| 4 | 60027 | 000 | 00-01 | gert | Kuro |
| ⋮ | | | | | |

| # | SERVER ID | CONDITIONS ||||
|---|---|---|---|---|---|
| | | FUNCTION | CAPACITY | VOLUME NUMBER | THROUGPUT |
| 0 | ruth | LC,RC,LW | 100TB | 100 | 2GB/s |
| 1 | topcat | LC,LW | 20TB | 200 | 3GB/s |
| 2 | flex | RC | 3TB | 50 | 1GB/s |
| ⋮ | ⋮ | ⋮ | ⋮ | ⋮ | ⋮ |

FIG. 20

| | 2001 | 2002 | 2003 | 2004 | 2005 OBJECT VOLUME 0 | | | 2006 OBJECT VOLUME 1 | | |
|---|---|---|---|---|---|---|---|---|---|---|
| # | SOURCE ID | ACCESS TYPE | OPERATION | | LUN | CHANNEL ID | HOST GRP ID | LUN | CHANNEL ID | HOST GRP ID |
| 0 | 0 | LOCAL COPY | PAIR CREATION | | 0 | 1 | 2 | 0 | 2 | 3 |

METHOD AND SYSTEM FOR CONTROLLING INFORMATION OF LOGICAL DIVISION IN A STORAGE CONTROLLER

CROSS-REFERENCE TO RELATED APPLICATIONS

The present application claims priority from Japanese application JP2004-265764 filed on Sep. 13, 2004, the content of which is hereby incorporated by reference into this application.

BACKGROUND OF THE INVENTION

The present invention relates to storage devices and more particularly to a disk array unit for storing data in a single or a plurality of disk units and a storage system comprised of a plurality of disk array units.

In recent years, the storage controller used in enterprises or the like has been increasing in scale year by year. For one thing, so-called consolidation in which a plurality of storage controllers are consolidated and used is responsible for scale increasing. More specifically, a system has hitherto been configured to meet different purposes by using a plurality of distributed storage controllers. The consolidation, however, has succeeded in collectively storing pieces of data for many different purposes in a single storage controller of large capacity.

By making a single storage controller of large capacity utilizable cooperatively to be shared among different systems in this manner, the installation area can be decreased and the cost of management of a plurality of storage controllers can be reduced. What matters is, however, security. Especially when pieces of data utilized in systems directed to different purposes or having different levels of requirements for security are stored in one storage controller, it of course matters that individual data pieces will be accessed erroneously or erased by mistake. As measures to solve these problems, performing access control based on authentication of access requesters or limiting access by using logical partitioning have been considered.

For example, in U.S. Pat. No. 6,484,173, a contrivance is disclosed according to which in a disk controller, access requesters are authenticated by means of ID's or passwords and only an operation authorized pursuant to an access control list is allowed.

Further, U.S. Pat. No. 6,684,209B1 or JP-A-2001-265655 describes a system in which access from a host computer or a discoverable LUN (Logical Unit Number) is limited by means of an ID of an access originator (for example, WWN (worldwide name) or S (source)_ID in Fiber Channel protocol).

Furthermore, US 2002/0103969A1 or JP-A-2002-182859 discloses a method for achieving system consolidation by carrying out volume logical division mainly according to the utilization rate or unoccupied capacity of a physical drive.

SUMMARY OF THE INVENTION

But performance required of a storage unit such as disk array unit and requirements or conditions required of a connection port for scalability are so stringent at present that a single disk array unit needs to be extended not only to a disk array unit of smaller-scale structure but also to a disk array unit of larger-scale structure. Users have aimed at collecting a large-capacity storage controller conventionally constructed using a plurality of storage controllers to an intensive large-scale storage controller and simplifying maintenance/management of the storage controller.

Under this direction, however, there arises a problem that in a plurality of systems realizing their independence and inviolability by being constructed of independent or separate storage controllers, common or shared portions are created because of the one intensive large-scale storage controller and security cannot be maintained sufficiently.

To solve the problem as above, the conventional storage controller adopts a contrivance according to which a controller authenticates servers or users representing access originators and applications used therein by means of requester ID's and only a person meeting the authentication is allowed for accessing. In other words, the conventional storage controller employs a method in which a type of decision logic for accepting or rejecting the access of interest in accordance with a management table of object volumes and functions (such as read, write, copy and mirroring) permitted for each system is introduced into the storage controller to make suitable control possible (see U.S. Pat. No. 6,484,173). Further, in a storage controller conforming to, for example, Fiber Channel protocol representing standard access protocol, a controller identifies a specified request source (in this case, a HBA (host bus adaptor) carried on a server rather than the server) by utilizing an S_ID exchanged between the server and the storage controller so as to decide an accessible volume (for example, see U.S. Pat. No. 6,684,209B1 or JP-A-2001-265655 or US 2002/0103969A1 or JP-A-2002-182859).

But in the methods disclosed in the above known techniques, problems as below are pointed out. Namely, since, in the one intensive large-scale storage controller, the controller on the one hand uses information not utilized in the protocol associated with the standard storage controller, such as user ID and application ID, to thereby force a unique technique to be adopted and on the other hand the controller in the storage controller must manage information such as user ID, application ID or server ID, in connection with which a temporary change or erase or a change in right to access is expected to occur frequently. Further, when a plurality of storage controllers are utilized, there also arises a problem that the controllers must be engaged in maintenance of the information such as user ID, application ID or server ID in the plural storage controllers.

In addition, in the intensive one large-scale storage controller, a host computer sometimes operates other functions inside the storage controller than data read/write through the medium of an In-band I/F (the same interface as that for accessing data inside the storage controller). More specifically, in that case, a volume group accessible by the host computer in the In-band I/F can be set to be handled as a range within which operation of the functions of interest in the storage controller is allowed. In that case, all the functions utilizable in the storage controller can be utilized by the host computer without limitation, or a host computer for reading/writing the volume group in the storage controller and a host computer for operating the function through the In-band I/F can be the same one. Furthermore, such a restriction as to add a new construction necessary to perform setting of a logical path of the readable/writable volume group must be imposed on the host computer for operating the functions of the storage controller through the In-band I/F.

To solve the above problems, in a storage system according to one embodiment of this invention, one or plurality of basic storage controller units each including a channel control unit, a disk I/F control unit, a processor unit, a memory unit and an internal network unit for connecting these components are mutually connected by means of the internal network unit, thereby forming one storage controller. Further, in the storage system, individual resources in the storage controller (host channel, disk I/F, logical volume group, processor, memory, internal network and other various functions in the storage controller) are logically divided into one or a plurality of groups, one or a plurality of In-band I/F's related to individual groups are provided, whereby in connection with an access request routing through the In-band I/F, its influence range and utilizable function are made to match with associated group so as to reject unmatched access requests and only an access request to a volume capable of serving as a utilizable function and a utilizable access object are processed.

Moreover, a management server utilizes information concerning a division condition of groups in the storage controller (namely, a condition that a plurality of logical storage controllers exist in actually existent physical basic storage controller units) and manages information concerning linking between the logically divided groups and the utilizers thereof such as servers or users or applications utilized thereby.

BRIEF DESCRIPTION OF THE DRAWINGS

FIG. 6 is a diagram showing an example of a table for managing the relation between logical volume and logical group in the storage controller.

FIG. 7 is a diagram showing an example of a table indicative of the relation between allotment of the throughput of processor and logical group.

FIG. 12 is a diagram showing an example of information managed in the management server.

FIG. 15 is a diagram showing an example of a table summing up user's requirements required of the storage controller utilized by each server.

FIG. 20 is a diagram showing an example of analysis of a requested access.

DESCRIPTION OF THE EMBODIMENTS

In the embodiments of the present invention, there are first provided a storage controller in a basic unit and a storage system having a plurality of storage controllers, each being in a basis unit, connected so as to be used as a large-scale storage controller.

In this storage system, internal resources can be divided logically into groups so that a plurality of logical storage controllers may exist in a single large-scale physical storage controller. In this storage system, for a function such as read/write in the storage controller, a logical group is defined in accordance with requirements or conditions imposed by a user.

In that case, the storage system performs setting of definable resources in the logical group by not only setting permissibility/impermissibility of utilization of such resources as logical volume and channel, cache capacity, internal network bandwidth and processor but also adding, to the logical group, permissibility/impermissibility of utilization of special processes (hereinafter referred to as "functions") such as local copy, remote copy, WORM (Write Once Read only Medium) function to be applied to the logical volume and external copy function.

In this phase, the storage system may add, as an attribute of the logical group into a definition of the In-band I/F serving as an I/F for operating the aforementioned functions in the storage controller, so that the volume, channel and function of the logical group can fall within the object range of operation by a host computer. Then, by rejecting an access deviating from the object range, the storage system can prevent the whole of the storage controller from being threatened by illegal or unauthorized accesses. Further, a management server manages the correspondence between the plural defined logical storage controllers (logical groups) and the server, user and application using them, thereby simplifying management information in the storage controller to enable the management server to perform centralized management of rights to access.

Embodiments will now be described by way of example with reference to the accompanying drawings.

Figure 1:
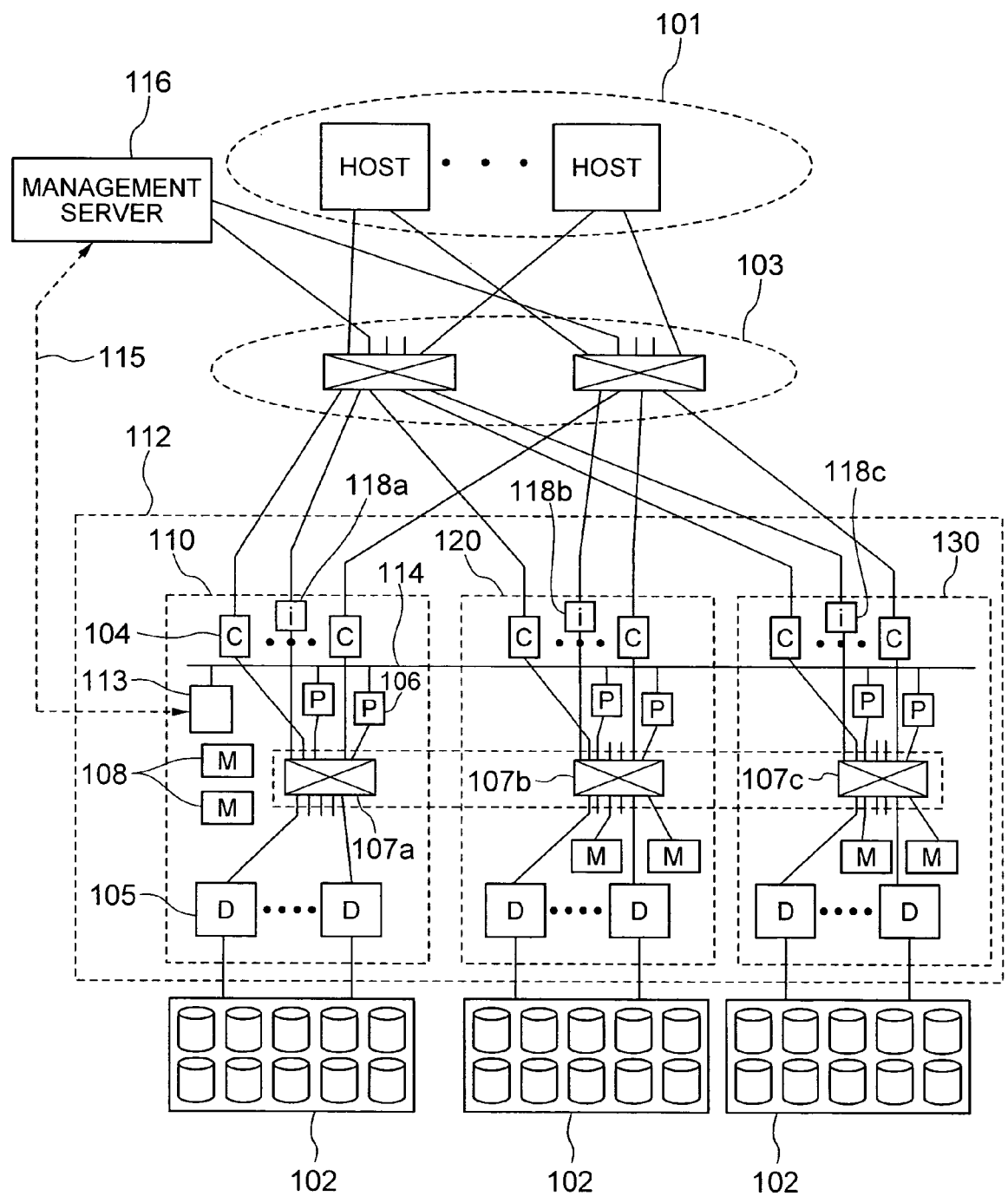
FIG. 1 is a block diagram showing a configuration of a storage controller and other system components and an example of logical groups in the storage controller.

FIG. 1 is a block diagram showing an example of system configuration of a storage controller according to a first embodiment.

A storage controller 112 includes one or a plurality of logical groups (or logical storage controllers) each having a set of logical resources. In the figure, components designated by reference numerals 110, 120 and 130 correspond to the logical groups, respectively. Each of the logical groups 110, 120 and 130 includes, as shown in FIG. 1, a channel unit 104 acting as a connection port to host computers 101, a disk interface unit 105 acting as a connection port to a disk unit group 102, a processor unit 106 comprised of one or plural processor elements, a memory unit 108 and an internal network unit 107a, 107b or 107c for mutual connection of the above constituent elements.

Here, the individual constituent elements represent logical resources. For example, the processor unit 106 is physically one processor and each of the internal network unit 107a, 107b and 107c is physically one network (for example, a switch or particularly a bus may be used without changing the essence of this invention) but they are logically divided into plural components which exist as constituent elements in each logical group. Likewise, a communication network 114 logically indicates the existence of a communication network between the processor unit 106 and a management control terminal 113 in the storage controller 112. Further, the storage controller 112 connects to an external management server 116 via a communication network 115 and various kinds of information are exchanged between the two.

In some applications, the management server 116 may be connected through the medium of a connection I/F routing through the communication network 115 for data communication different from that routing through a communication network 103 (for example, SAN (Storage Area Network) of FC (Fiber Channel)) through which the host computer group 101 carries out data transfer to the storage controller 112.

Furthermore, in the present embodiment, the connection I/F through which the host computer group 101 carries out command transfer to the storage controller 112 is indicated as In-band I/F (118a, 118b, 118c). Obviously, the host computer group sometimes uses this I/F for the purpose of performing communication other than the data transfer. In the figure, the In-band I/F's (118a, 118b,118d) are illustrated as being provided one by one to the logical groups 110, 120 and 130, respectively, but the provision of two or more In-band I/F's does not matter.

Figure 2:
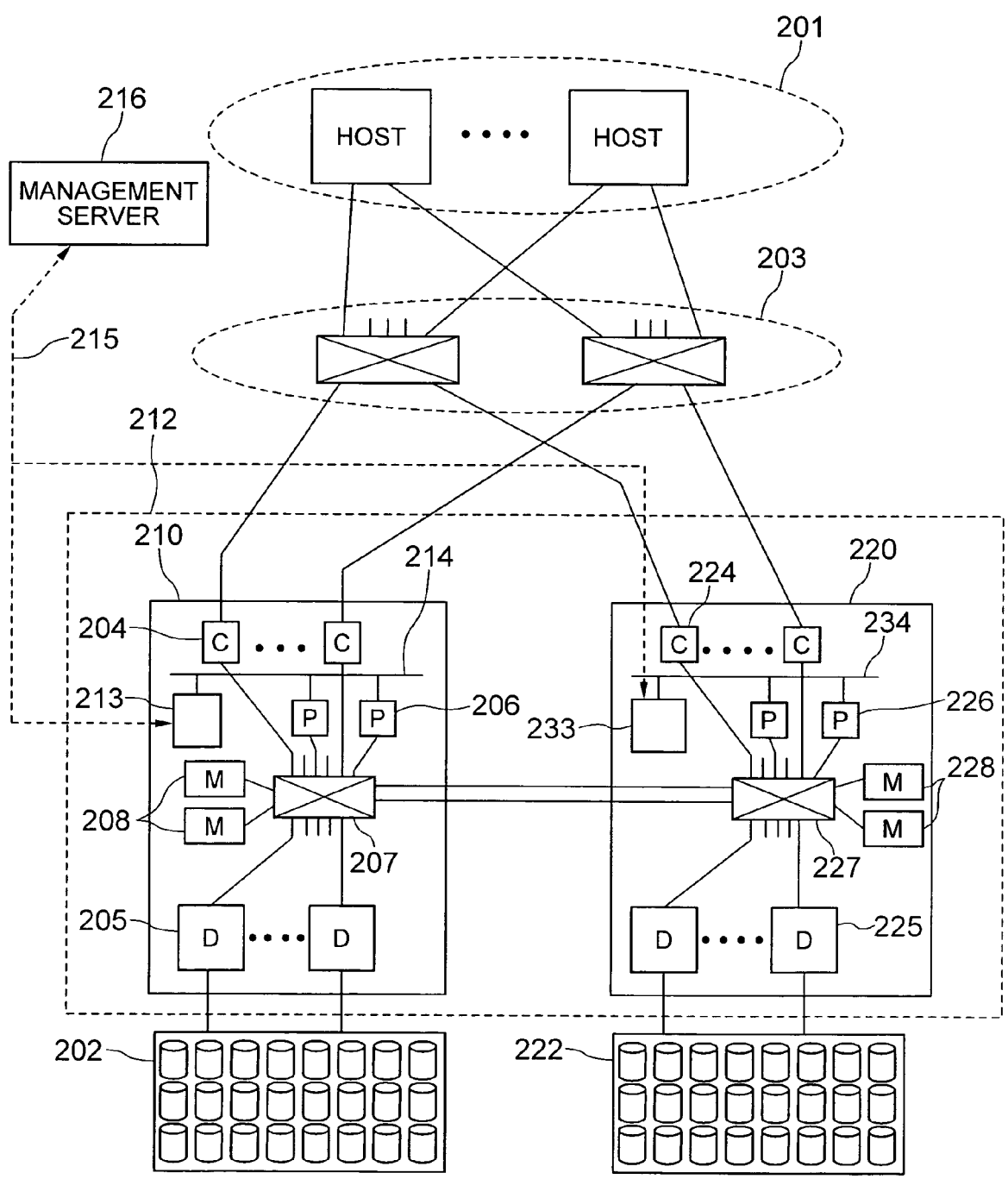
FIG. 2 is a block diagram schematically showing physical components of an example of the configuration of storage controller and other system components.

Next, with reference to FIG. 2, the example of system configuration explained in connection with FIG. 1 will be described from the standpoint of physical resource. In FIG. 2, a storage controller 212 corresponds to the storage controller 112 in FIG. 1 but it includes, as actual constituent elements, one basic storage controller unit 210 having one or plural host channel units 204, one or plural disk interface units 205, one or plural processor units 206, one or plural memory units 208, one or plural internal network units 207 and a communication network 214 for connecting the processor units 206 to a management terminal unit 213; and the other basic storage controller unit 220 having similar constituent elements. The basic storage controller units 210 and 220 are connected together through internal networks 207 and 227. A communication network 215 between management server 216 and storage controller 212 is adapted to connect the management terminal units 213 and 233 of basic storage controller units 210 and 220 to the management server 216. In the figure, the communication network 215 connects the respective management terminal units 213 and 233 but a connection mode may be employed in which the management terminal units 233 and 213 are first connected together and then the management terminal unit 213 is connected to the management server 216. With the communication network 215 in any connection mode does not change the effect of this invention.

As shown in FIG. 1, the In-band I/F (118a, 118b, 118c) is structured logically and they are materialized concretely as a combination of physical devices. For example, it is conceivable that logical storage areas (also called "volumes") are formed in a storage area 102 that the storage controller 212 has and one of them is used as an area 603 (LUN-1, for example) in which the host 201 and management server 216 write commands for management (this is called a "command device"). This command device is formed in each logical group. As another example, it is conceivable that, for example, the host 201 and management server 216 use the physically same port 311 (see FIG. 3) and in this case, as the In-band I/F (118a, 118b, 118c) used for management in reception of a packet from the management server 216, a specified port number is set, from the group of ports 311-318, to a physical port 311 of the storage controller 212.

Here in making the correspondence between a description given of a set of logical resources shown in FIG. 1 and a description given of the physical construction shown in FIG. 2, the following combinations may be conceived in respect of the relation between the basic logical controller units 210 and 220 in FIG. 2 and the logical groups (logical storage controllers) 110, 120 and 130. Firstly, the first way of thinking (rule) purports that the logical groups 110, 120 and 130 are configured throughout the basic storage controller units 210 and 220. The second way of thinking (rule) purports that the logical groups 110, 120 and 130 are not configured throughout the basic storage controller units 210 and 220, that is, they are formed from any one of the basic storage controller units.

If following the first rule, the whole or part of the logical groups 110, 120 and 130 are configured with resources overrunning the basic storage controller units 210 and 220. In other words, any one of the logical groups 110, 120 and 130 is materialized using both the basic storage controller units 210 and 220 representing physical resources, attaining a division approximating an image closer to the physical configuration. Accordingly, by limiting access to one of the basic storage controller units 210 and 220 in partnership, independency at higher level can be maintained. Even in the first rule, independency of the logical groups 110, 120 and 130 from each other can be kept through logical control.

Next, if following the second rule, there is available the first configuration example purporting that all of the logical groups 110, 120 and 130 are configured from resources on one basic storage controller unit 210. Also, according to the second configuration example, two arbitrary ones of the logical groups 110, 120 and 130 are materialized on the basic storage controller unit 210 and the remaining one logical group is configured from resources on the other basic storage controller unit 220. Further, according to the third configuration example, all of the logical groups 110, 120 and 130 are configured from resources on the other basic storage controller unit 220.

In addition, another example of configuration of the storage controller 212 will be described.

As another example of the storage controller 212, a configuration of storage controller will be described briefly.

The storage controller includes two control clusters, which control clusters have independent power supplies and complete redundant structures so as to undertake a duplex process, with the result that even when a fault occurs in one system, the two control clusters can operate normally.

Structurally, each control cluster includes a channel adapter (CHA) and a cache memory so that the channel adapter (CHA) may receive a write command from a host computer (server unit) and the write command may be registered in the cache memory. In addition, each control cluster includes a disk adapter (DKA) to constantly monitor the contents of the cache memory.

One of the two control clusters includes a high-speed crossover switch and is so constructed as to switch data flow between the channel adapter (CHA) and cache memory and the disk adapter (DKA). The disk adapter (DKA) is so constructed as to take out write data from the cache memory in accordance with the registered contents of the cache memory and write it into a hard disk drive (HDD) of a disk drive unit (DKU).

Also, each control cluster puts a plurality of hard disk drives (HDD's) together to form a single RAID (Redundant Array of Inexpensive Discs) group and logically divides the RAID group to set up a logical save area LU (Logical Unit).

During data read, operation inverse to the aforementioned write operation proceeds, which will not be described. The other control cluster operates similarly to the aforementioned control cluster and will not be described.

Figure 3:
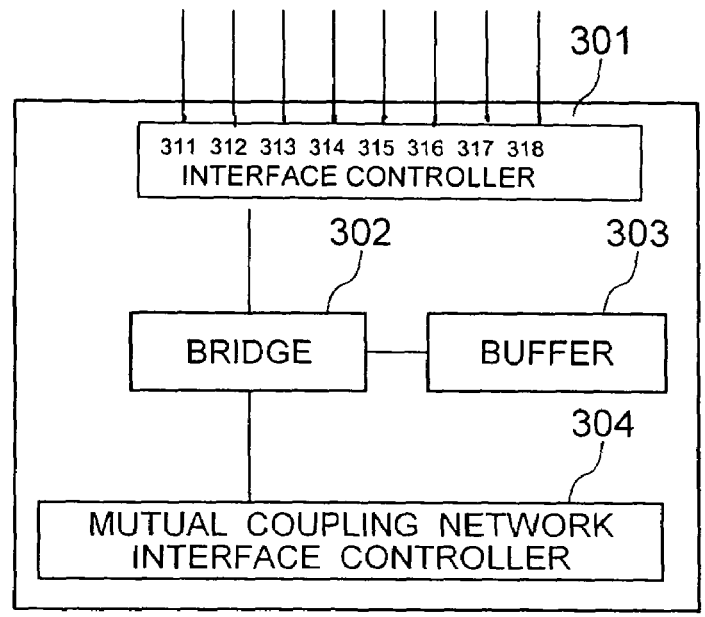
FIG. 3 is a block diagram showing an example of construction of a channel unit or a disk interface unit.

Referring now to FIG. 3, construction and operation of the channel unit or disk interface unit will be described. FIG. 3 illustrates in block diagram form an example of construction of the channel unit or disk interface unit. The channel unit 104 or disk interface unit 105 shown in FIG. 1 and the channel unit 204 or disk interface unit 205 shown in FIG. 2 have each an interface controller 301, a mutual coupling network interface controller 304 for controlling the connection to the internal network, a bridge 302 for coupling the controllers 301 and 304 and a buffer 303 used for the purpose of temporarily holding transfer data. For example, in FIG. 3, the interface controller 301 controls the connection to the external network through physical ports 311-318 via the bridge 302 and buffer 303 and the mutual coupling network interface controller 304 controls the connection to the internal network via the bridge 302 and buffer 303.

Figure 4:
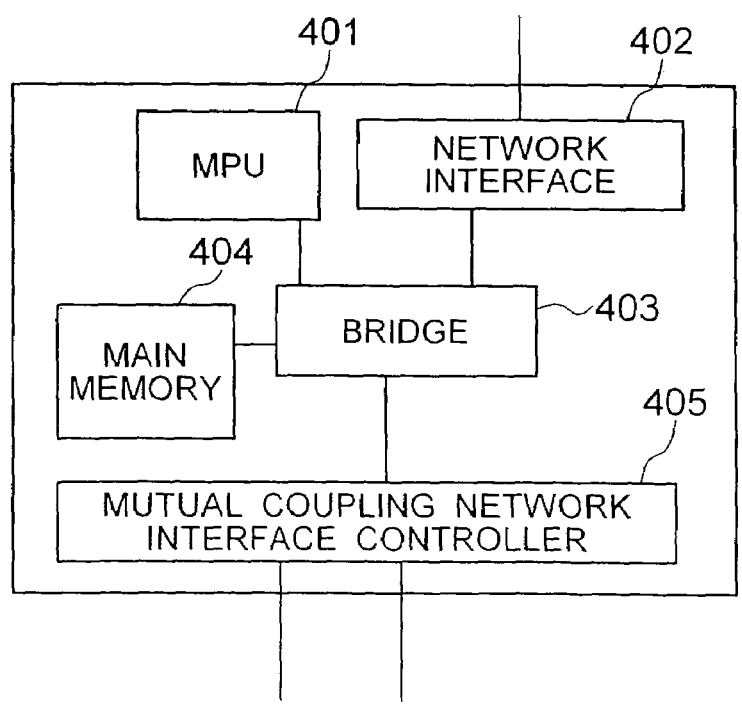
FIG. 4 is a block diagram showing an example of construction of a processor unit.

FIG. 4 illustrates in block diagram form an example of construction of the processor unit 106 shown in FIG. 1 and processor unit 206 shown in FIG. 2. The processor unit 106 shown in FIG. 1 and processor unit 206 shown in FIG. 2 have each a MPU (Micro Processor Unit) 401, a network interface unit 402 for communication with the outside, a main memory 404, a mutual coupling network interface controller 405 and a bridge 403 for coupling the above components together. For example, management information from the communication network 115 shown in FIG. 1 is supplied to the MPU 401 through the network interface 402 and bridge 403, the MPU 401 carries out a given process on the basis of the inputted management information and the mutual coupling network interface controller 405 controls the connection to the internal network through the bridge 403 and main memory 404.

Figure 5:
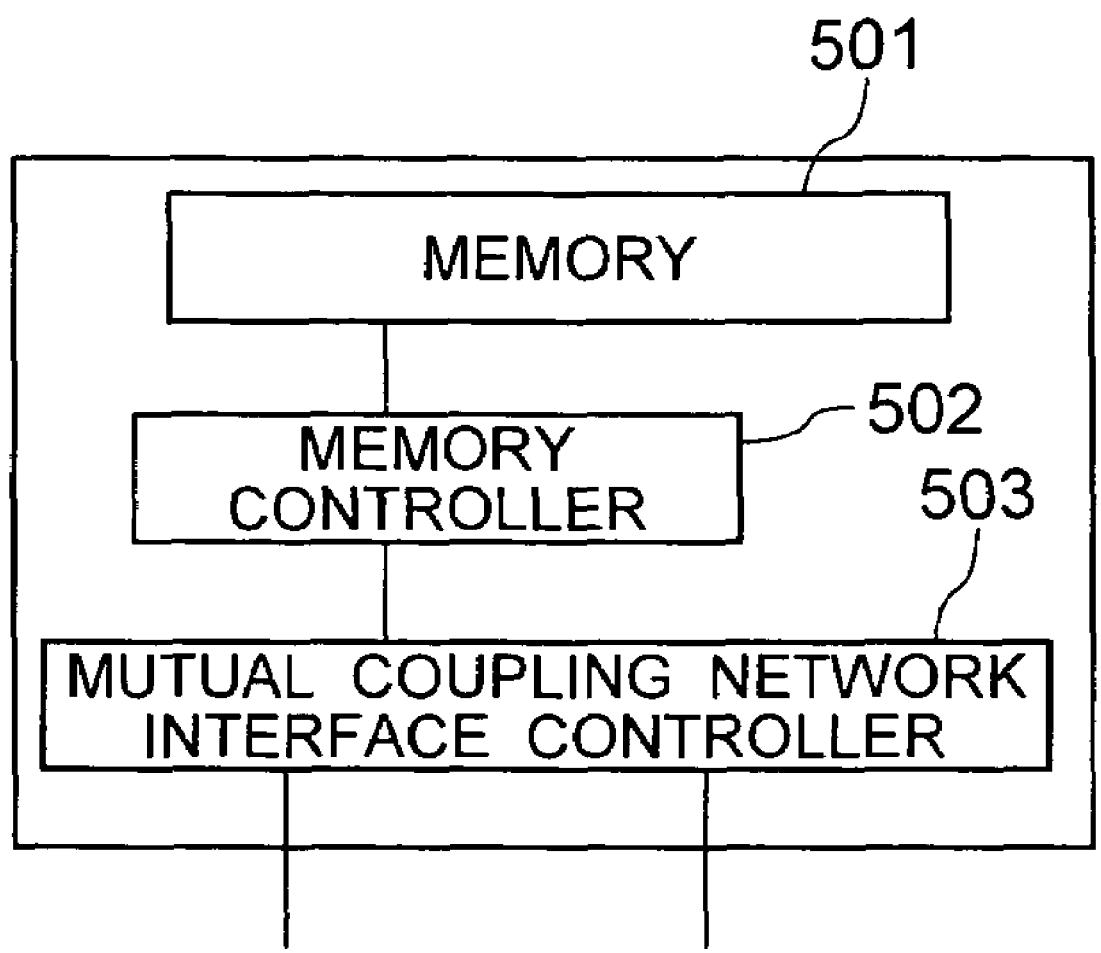
FIG. 5 is a block diagram showing an example of construction of a memory unit.

Next, by making reference to FIG. 5, construction and operation of the memory unit used in the first embodiment will be described. FIG. 5 depicts an example of construction of the memory unit.

The memory unit 108 shown in FIG. 1 and memory unit 208 shown in FIG. 2 have each a memory 501, a memory controller 502 and a mutual coupling network interface controller 503. For example, in FIG. 5, the mutual coupling network controller 503 controls the connection to the internal network and the memory controller 502 controls write and read of data to and from the memory 501.

As described above, the storage controller 112 manages individual resources in the storage controller 112 by dividing them into logical groups. Accordingly, the storage controller 112 holds management information to be described below in the form of a tape or a database. For example, the management information may be held in position at the memory unit 108 of logical storage controller 110 or the memory unit 208 of basic storage controller unit 210 but its copy may be held in the main memory 404 of the processor 106 or 206.

FIG. 6 is a table for managing the correspondence of logical volume defined in the storage controller with logical volume.

The table shown in FIG. 6 has, in respect of individual logical groups at 601, volume ID's at 602, LUN numbers at 603 allotted to individual volumes, volume group ID's at 604 for defining sets each of which contains a plurality of volumes, channel ID's at 605 to which individual volumes are allotted, logical group ID's at 606 to which individual logical groups belong, and host group ID's at 607 for identifying individual groups obtained by logically dividing the channel in relation to one or plural host computers. This table shows which one or ones of logical groups a particular volume belongs to in the storage controller 112.

FIG. 7 is a table indicating which one or ones of logical groups the processor and its throughput are allotted to and how much the allotment is.

The table shown in FIG. 7 shows, in respect of individual groups at 701, at what allotment rates at 703 the throughput is given to processor ID's at 702 and their logical groups at 704.

Figure 8:
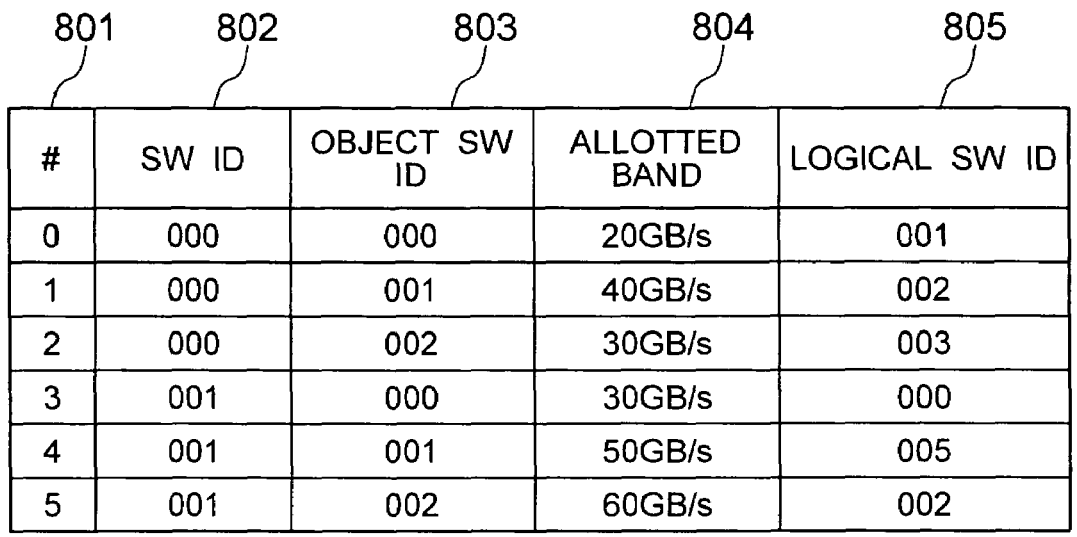
FIG. 8 is a diagram showing an example of a table indicative of the relation between logical division of internal network and logical group.

FIG. 8 is a table showing the allotment rate of bandwidth of the internal network to individual logical groups.

The table shown in FIG. 8 has, in respect of individual logical groups at 801, SW ID's at 802 of switches SW in the internal network units 107a, 107b and 107c in the logical storage controllers 110, 120 and 130 (see FIG. 1) and in the internal network units 207 and 227 in the basic storage controller units 210 and 220 (see FIG. 2), logical group ID's at 803 of bandwidth allotment objects, bandwidth allotment amounts at 804 and logical SW ID's at 805 for identifying the items in terms of logical switches SW.

Figure 9:
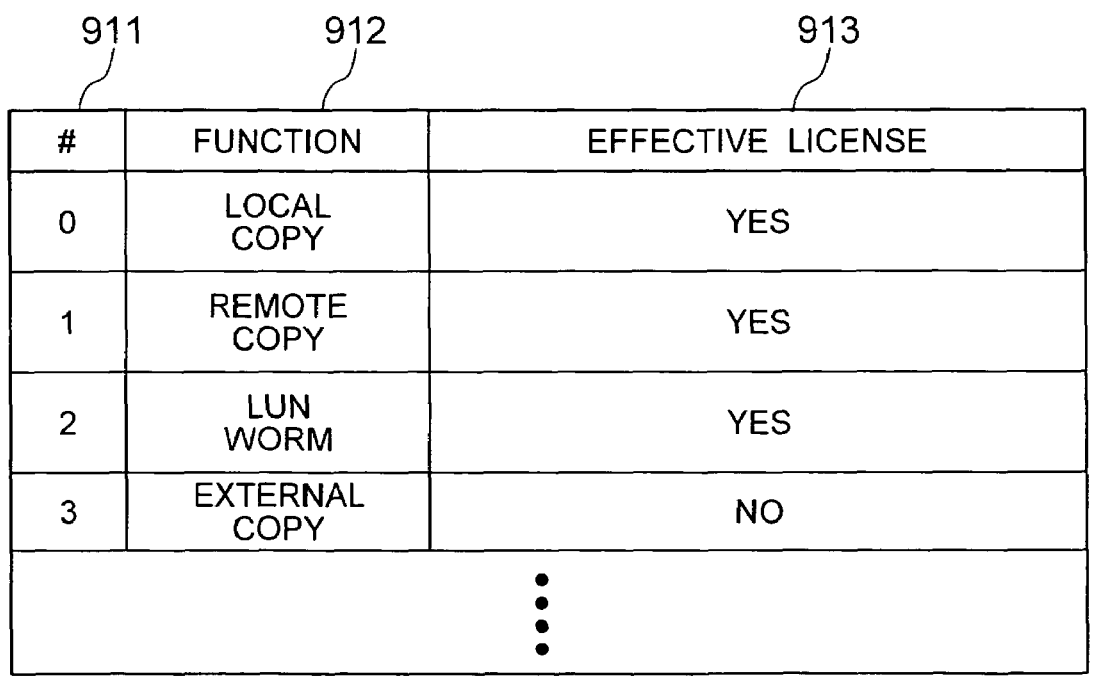
FIG. 9 is a diagram showing part of functions utilizable in the storage controller.

FIG. 9 is a diagram for indicating whether functions at 912 the storage controller has and licenses at 913 for making the functions valid have already been installed.

In FIG. 9, functions indicated at 912 are permitted to be utilized by giving effective licenses at 913 in respect of individual logical groups at 911. For example, it is demonstrated that in a logical group 0 indicated at 911, a local copy function indicated at 912 has an effective license indicated at 913.

In connection with a logical group 1, a remote copy function is so demonstrated as to have an effective license and in connection with a logical group 2, a WORM function for logical volume is so demonstrated as to have an effective license. Also, in connection with a logical group 3, an external copy function for logical volume indicated 912 is so demonstrated as to have an effective license.

The functions shown in FIG. 9 are representative ones and there are many other functions including read, write, copy and mirroring. The storage controller 112 has, as information, an identifier of the In-band I/F (118a, 118b, 118c) cooperative with a logical group of interest. It is to be noted that a plurality of In-band I/F's (118a, 118b, 118c) may belong to one logical group.

Figure 10:
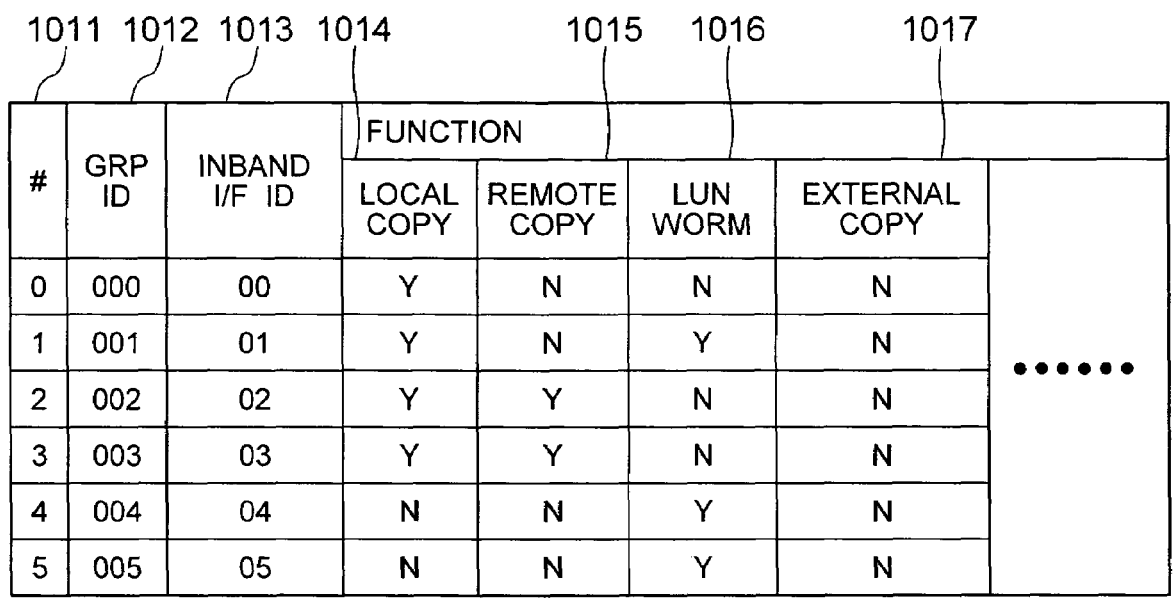
FIG. 10 is a diagram showing an example of a table indicative of the relation between function in the storage controller and each logical group.

FIG. 10 is a table showing an example of the relation between function in the storage controller and each logical group.

The table shown in FIG. 10 shows Yes/No (Y/N) for indicating whether functions permitted to be utilized for logical group ID's at 1012 and In-band I/F identifiers at 1013 belonging to individual logical groups at 1011 have each an effective license, the functions herein referred to being local copy at 1014, remote copy at 1015, WORM for logical volume at 1016 and external copy at 1017.

Figure 11:
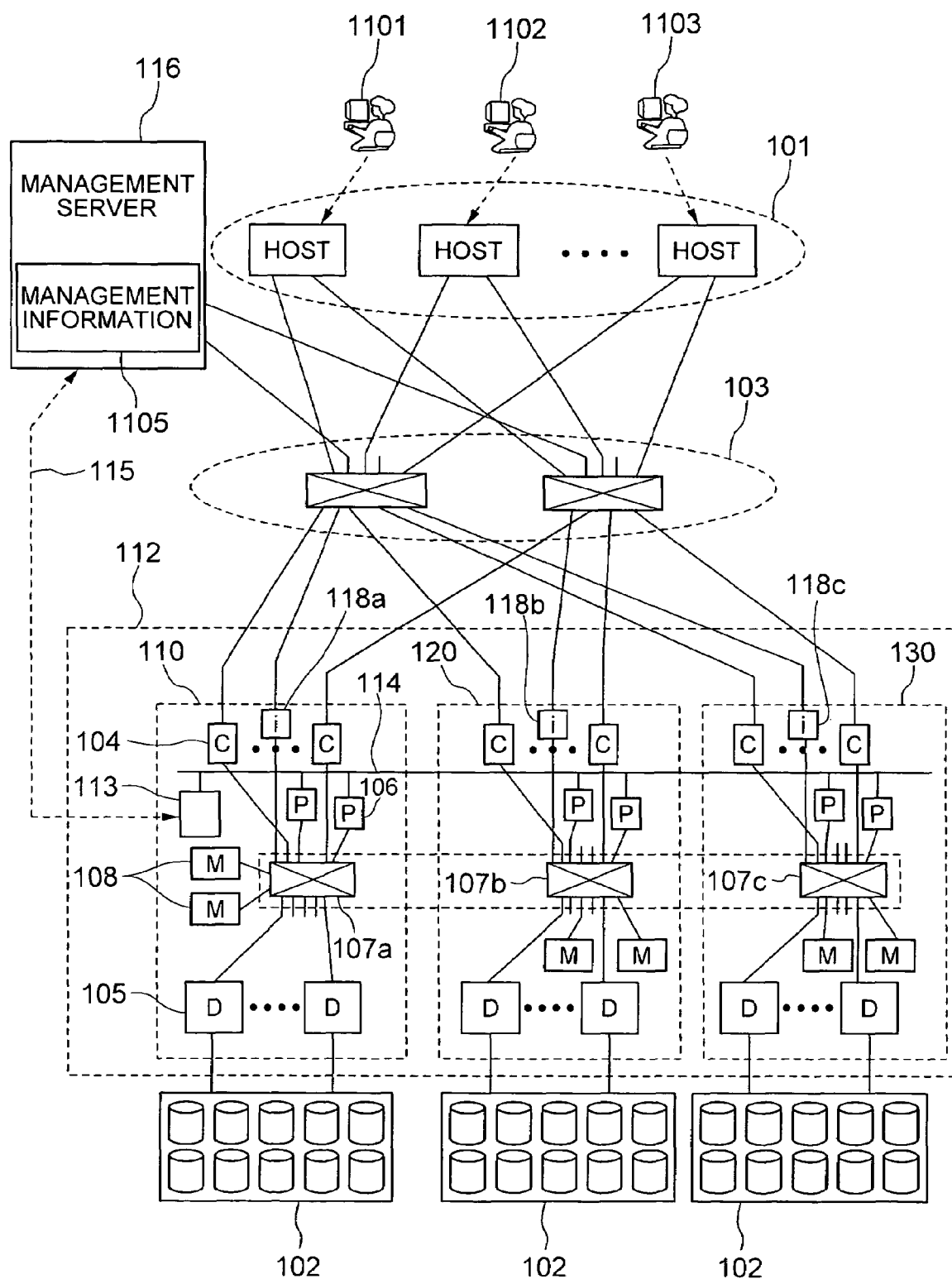
FIG. 11 is a block diagram showing an example of concrete system configuration illustrative of a configuration by which a management server manages the storage controller and other components.

FIG. 11 is a block diagram showing an example of a concrete system configuration in which the management server 116 manages the storage controller and other components.

FIG. 11 shows that the management server 116 holds management information 1105 for managing, in the system configuration shown in FIG. 1, the relation among host computer (server unit) 101, individual users 1101, 1102 and 1103 and logical groups 110, 120 and 130 in respect of individual logical groups at 1011 shown in FIG. 10.

Here, the management server 116 follows conditions or requirement required of a storage controller by a utilizer (server or user) so as to either utilize an existing logical group or define a new logical group. Obviously, when the information about the server or user or information in the storage controller changes, the management server 116 reflects the change in information upon management information 1105 managed by itself.

FIG. 12 shows an example of information managed in the management server 116.

As shown in FIG. 12, the information managed in the management server 116 includes identifiers at 1202 of storage controllers recognized in individual logical groups at 1201, identifiers at 1203 of logical groups defined in the individual storage controllers, identifiers at 1204 of In-band I/F's for accessing the individual logical groups, identifiers at 1205 of host computers utilizing the individual logical groups and identifiers at 1206 of users, and the management server 116 operates to manage the relation among these identifiers.

Figure 13:
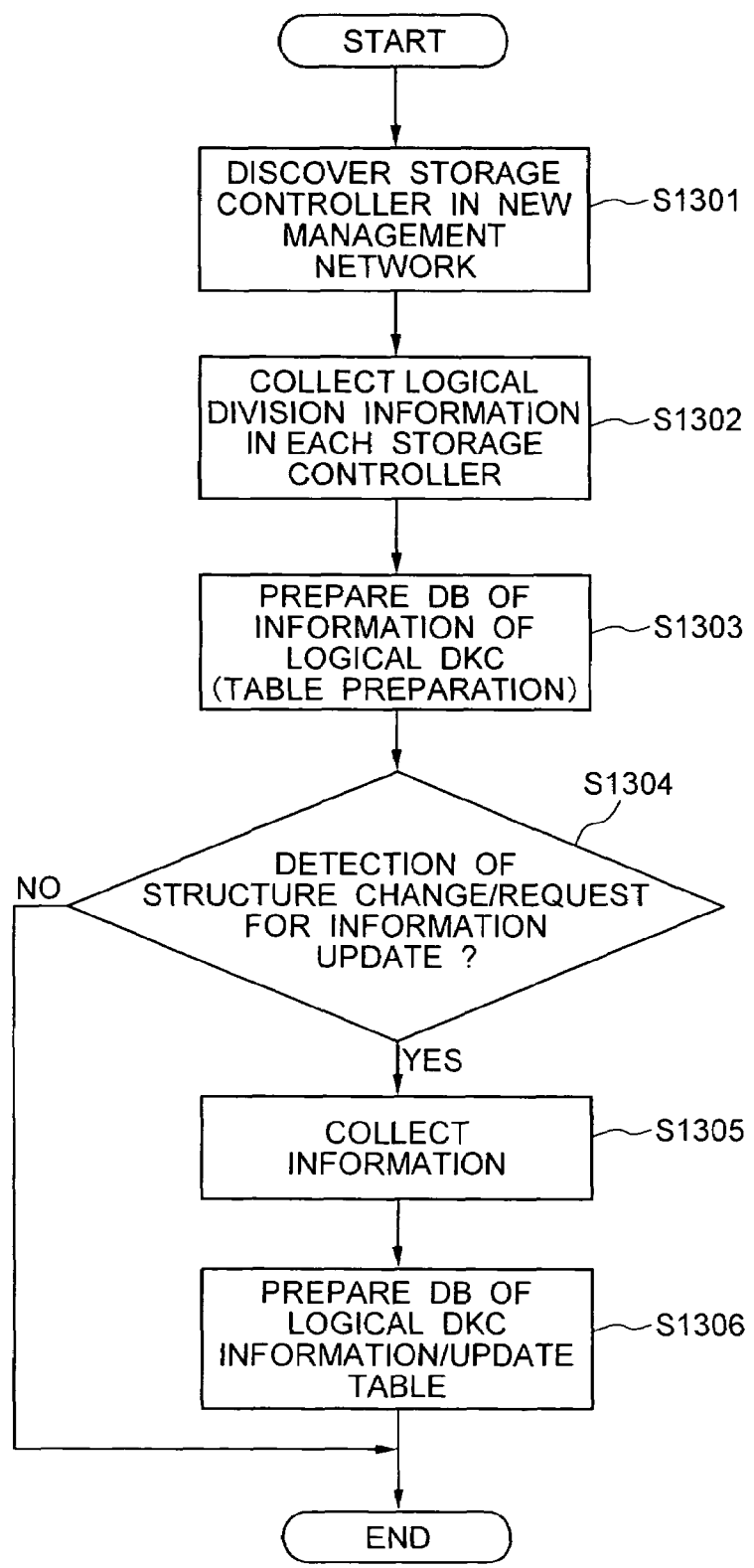
FIG. 13 is a flowchart of a maintenance process when information in the storage controller is collected and managed.

Next, by making reference to FIG. 13 showing a flowchart of a process for maintenance of the management information, operation of the maintenance process in the embodiment of this invention will be described.

In FIG. 13, the storage controller 112 first discovers a storage controller inside a new management network (step S1301). As for a method of discovery, a SNMP (Simple Network Management Protocol) used in general may be used or discovery may be done by designating the range of IP address. When the discovery of the storage controller in the new management network ends, the storage controller 112 subsequently collects definition conditions inside the storage controller (step S1302).

Thereafter, the storage controller 112 tabulates, from the collected information, information concerning the logical group (logical storage controller) defined in each storage controller and stores the resulting information in a management information database (step S1303). Thereafter, the storage controller 112 responds to a periodical command or a command from a custodian to decide whether detection of the presence or absence of a change in configuration is to be examined or whether a notice of requesting information change is to be received from the storage controller (step S1304) and if the aforementioned configuration change detection or information change request is present, the storage controller 112 follows it to perform information collection (step S1305). Subsequently, the storage controller 112 responds to the thus collected information to update the logical storage controllers prepared or set up in the step S1303 (step S1306).

In this manner, after the information on the storage controller side providing a base have been completed, the information is related to the utilizer such as server or user. The term "user" used hereinafter will imply, in addition to "user" meaning an actual utilizer, an operation of, for example, the server or application. The "user" is the representative term.

Next, with reference to FIGS. 14 and 15, a maintenance process carried out when the user information and information of the storage controller unit are managed by making the correspondence therebetween in the present embodiment will be described.

Figure 14:
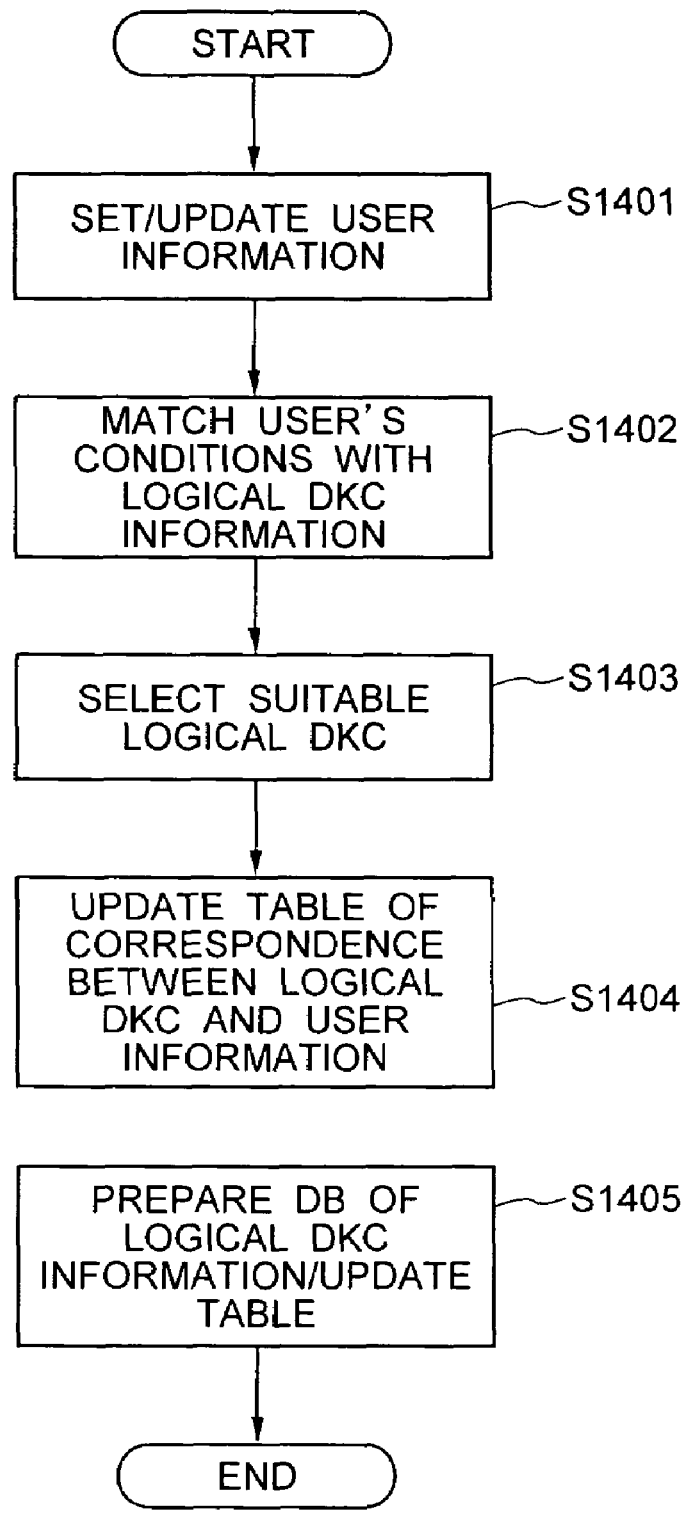
FIG. 14 is a flowchart of a maintenance process when user information and the information in the storage controller are managed by making the correspondence therebetween.

FIG. 14 is a flowchart of a maintenance process when the user information and the information of storage controller are managed by making the correspondence therebetween and FIG. 15 shows an example of a table summing up conditions required of storage controllers utilized by individual servers.

Firstly, in the FIG. 14 flowchart, the storage controller unit 112 sets or updates user information on the basis of information from a host 101 (step S1401). Specifically, the user information includes requirements or conditions required of logical storage controllers (logical groups) utilized by individual servers at 1501 in respect of individual logical groups at 1500 and for example, as the conditions, functions at 1502, capacities at 1503, volume numbers at 1504 and throughputs at 1505 are set. Responsive to the user information from the user (custodian), the storage controller 112 collates these conditions with information defined in the storage controller 112 at present to carry out a suitable process (step S1402).

Here, on the assumption that the storage controller 112 adds a user of an existing logical storage controller, the storage controller 112 selects suitable conditions required of the existing logical storage controller (step S1403) and adds the newly selected information to an information table related to the user information managed in the management server 116 as shown in FIG. 12, for instance, to update the information table (step S1404). Subsequently, the storage controller 112 updates information in the database or table of the logical storage controller (step S1405). Through this, the logical division of logical storage controller set in compliance with user's conditions during setting can be updated by adding a new unit of logical division during update.

Figure 16:
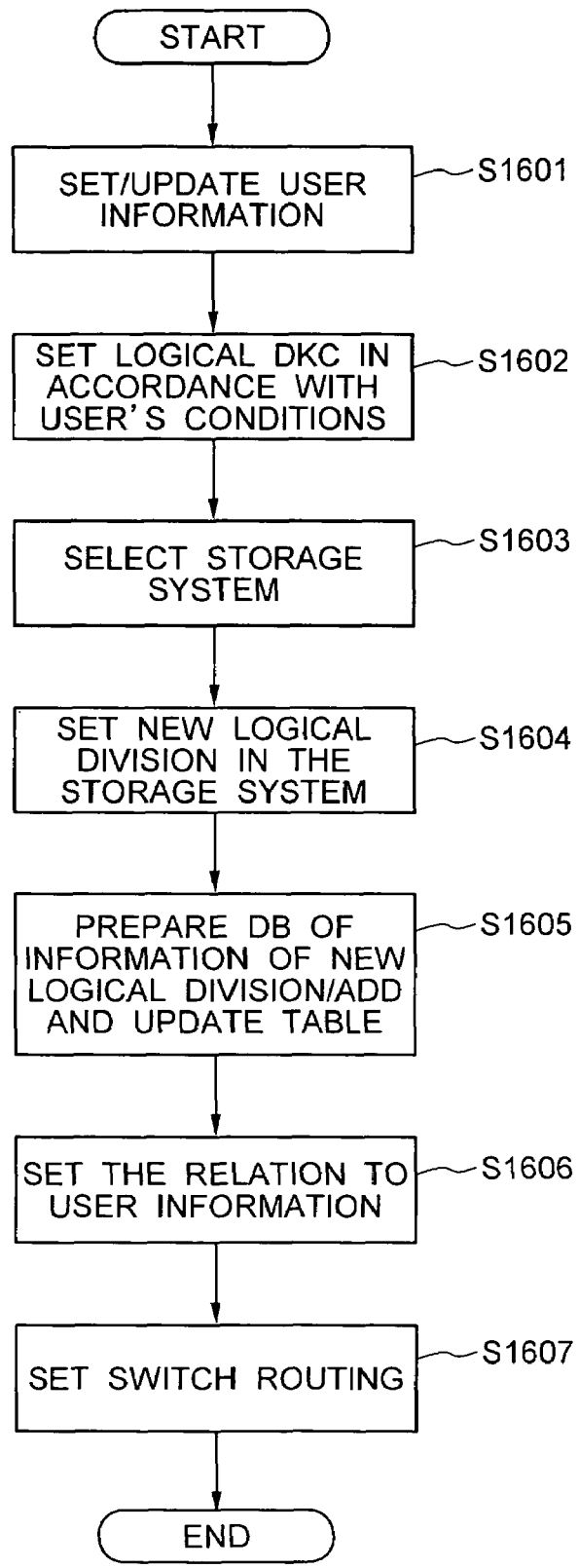
FIG. 16 is a flowchart of an additional definition process for creating a new logical group which meets the user's requirements.

Referring now to FIG. 16, a process of applying an additional definition to the logical storage controller meeting user's conditions will be described. FIG. 16 is a flowchart of an additional definition process for creating a new logical group meeting the user's conditions.

The flowchart shown in FIG. 16 shows a flow of additional definition by the storage controller 112 when a logical storage controller meeting user's conditions is not defined at present. Firstly, the storage controller 112 sets and updates the user information (step S1601). Subsequently, if, in respect of a logical group 0 shown at 1500 in FIG. 15, conditions by server ruth shown at 1501 are function LC (Local Copy), RC (Remote Copy) and LW (LUN WORM) function shown at 1502 which are desired to be utilized, their capacity is 100TB shown at 1503, the number of associated volumes at 1504 is 100 and besides expected throughput shown at 1505 is 2 GB/s, then the storage controller 112 tries to set conditions required of logical storage controllers and meeting the above presupposition as many as possible (step S1602). For example, in case the capacity is 100TB and the volume number is 100, the storage controller 112 defines 100 volumes each having 1TB. Further, if 2 GB/s is required of the throughput, the internal network bandwidth is first allotted to 4 GB/s in the system.

Next, the storage controller 112 selects logical groups 110, 120 and 130 constituting a storage controller on which the logical groups can be defined (step S1603). Subsequently, the storage controller 112 sets a new logical division in the storage controller selected as above, that is, in the logical groups 110, 120 and 130 (step S1604) and adds information of the logical groups newly defined in the step S1604 in the management information table to update it (S1605). Next, the storage controller 112 updates a table related to the user information (step S1606) and then sets a switch routing (step S1607).

Next, with reference to a flowchart in FIG. 17, a process of deciding access when an access request is received through the In-band I/F in the storage controller will be described.

Figure 17:
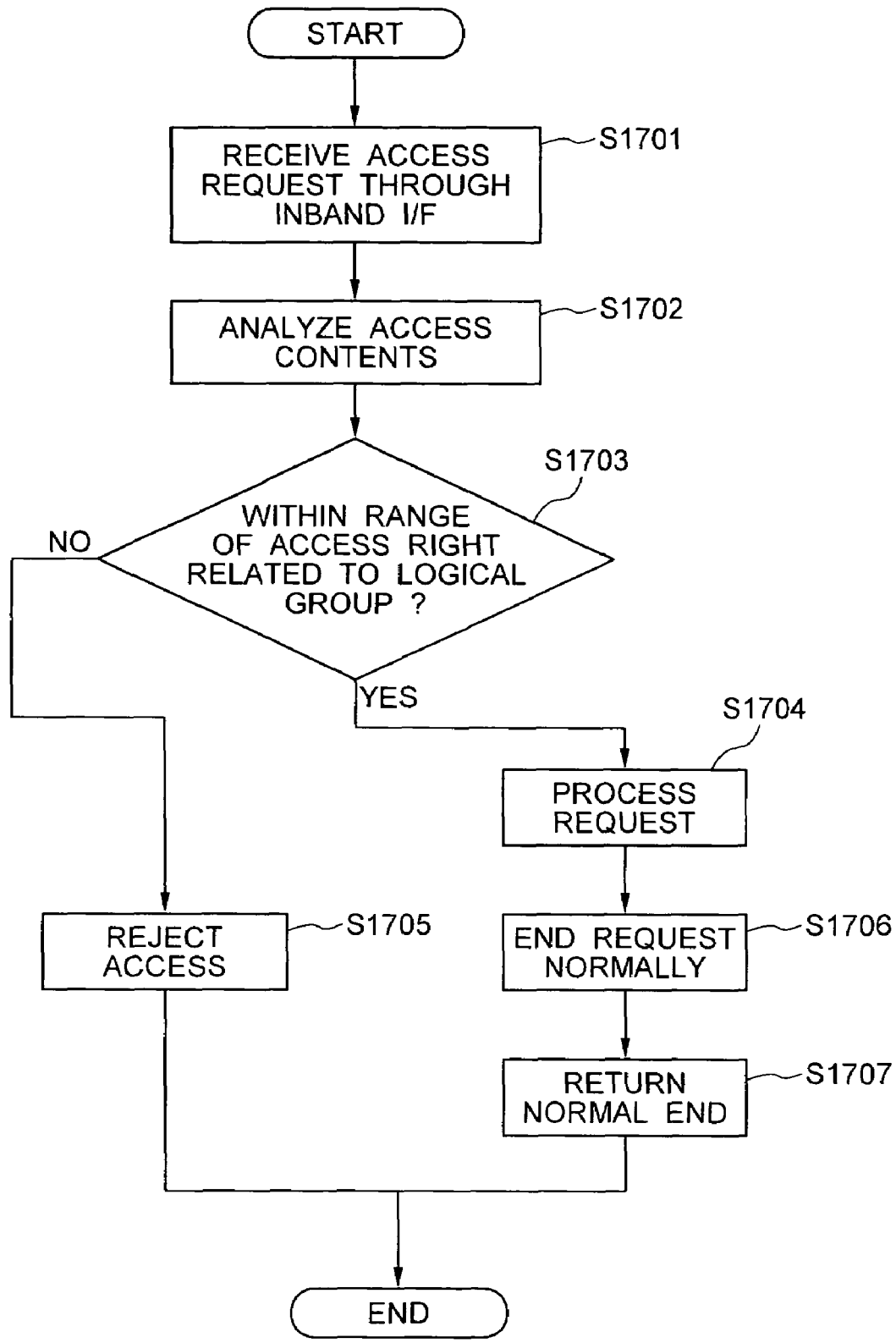
FIG. 17 is a flowchart of an access decision process when an access request through In-band I/F is received in the storage controller.

FIG. 17 shows a flowchart when the storage controller 112 receives an access request from a host computer 101 through the In-band I/F in order to operate a function in the storage controller.

Firstly, when receiving an access request through the In-band I/F (step S1701), the storage controller 112 analyzes the contents of the access (step S1702). Here, on the basis of information defined as shown in, for example, FIG. 10 or 6 in the storage controller, the storage controller 112 first determines that the access in question is within the right (whether the function is permissible) and decides secondly whether the access object is a resource in the range of the group of interest (for example, whether the object volume falls within the range of the group of interest) or whether the access object is within the influence range of right (step S1703).

If, in this decision step S1703, the access request is determined to exceed the range of the access right, the storage controller 112 rejects the access based on the access request (step S1705). On the contrary, if in the decision step S1703 the access request is determined to be in the range of the access right, the storage controller 112 carries out a process in accordance with the access request (step S1704) and confirms that the request ends normally (step S1706). Finally, process end is notified (step S1707) and the program ends.

A concrete example of operation based on the flowchart exemplified in FIG. 17 will be described by way of example of analysis of a requested access as shown in FIG. 20. More specifically, it is assumed that a user (custodian) makes a request for access as shown in FIG. 20 to the storage controller 112 from a server as shown in FIG. 20 through the In-band I/F (118a, 118b, 118c) in the storage controller 112. Here, the contents of the request is such that a local copy function, one of the functions of the storage controller, indicated at access type 2003 is used to perform an operation at operation 2004 for setting up the relation of copy pair having redundancy between a logical volume at 2005 and a logical volume at 2006.

At that time, in accordance with the FIG. 17 flow, the access requested by the storage controller 112 is first analyzed in the step S1702 and this request is determined to be for the access as shown in FIG. 20. Subsequently, the storage controller 112 consults a table of functions permitted for the logical groups 110, 120 and 130 to which the In-band I/F (118a, 118b, 118c) belongs (for example, the storage controller 112 makes reference to the table as shown in FIG. 10. In this example, it is assumed that the permitted function is In-band I/F#01 of GRP ID #001 shown at 1012 in FIG. 10). Then, since the conclusion by the storage controller 112 in the step S1703 indicates that the local copy function of this access request is given the right to operate "Y" (meaning yes), the user (custodian) is permitted to have the right to operate. Next, the storage controller 112 decides whether the object of the access request is within the range of this group. According to FIG. 20, designated as the object of copy pair are a volume of Channel ID#1, Host Group ID#2 and LUN#0 at logical volume 2005 (for example, volume ID#2 at 601 in FIG. 6) and a volume of Channel ID#2, Host Group ID#3 and LUN#0 at logical volume 2006 (for example, volume ID#S at 601 in FIG. 6).

According to the table of logical groups to which volumes belong (for example, the table as shown in FIG. 6), the two volumes are those belonging to different logical groups (with volume ID#2 belonging to 000 and volume ID#6 belonging to 001) and therefore, non-coincidence is determined, in the step S1703, between the access request object and the logical group and the storage controller 112 returns an access reject to end the program. In this manner, erroneous extinction of irrelevant data caused by such an operational error by the user (custodian) that the storage controller 112 takes a volume belonging to quite a different logical group for an operation object can be prevented or the storage controller unit 112 can reject an access request bearing a malice to data destruction, for instance.

An instance has been described in which responsive to requests by the users 1101, 1102 and 1103 shown in FIG. 11, logical groups capable of performing predetermined operations are set up in the storage controller 112 and operations unintended by the users 1101, 1102 and 1103 (for example, remote copy and WORM function) are commanded through the In-band I/F (118a, 118b, 118c) corresponding to the logical groups 110, 120 and 130. More particularly, in such a case, on the basis of information concerning the functions allotted to the logical groups 110, 120 and 130 made to correspond to the In-band I/F (118a, 118b, 118c) receiving the command, the storage controller 112 does not execute the operation. It is to be noted that in this case, the information from the In-band I/F (118a, 118b, 118c) prepared in correspondence with the logical groups 110, 120 and 130 set up by the requests from the users 1101, 1102 and 1103 is notified in advance to the users 1101, 1102 and 1103 having made the request.

As another example, such a mode can be considered in which the custodian of storage controller 112 prepares, in advance, logical groups 110, 120 and 130 capable of executing only special functions (for example, a logical group in which only remote copy is operated or a logical group unable to perform a process function related to copying) and the users 1101, 1102 and 1103 are allowed to select a specified logical group 110, 120 or 130.

In this case, the custodian of storage controller 112 prepares a desired number of logical groups 110, 120 and 130 in the storage controller 112 with a special intention in mind (also called "policy". For example, only one function is allotted to each logical group). Then, the functions allotted to the set up logical groups 110, 120 and 130 and a list of information for specifying In-band I/F (118a, 118b, 118c) corresponding to the logical groups 110, 120 and 130 are offered to the users 1101, 1102 and 1103, the offering of the information being such that for example, when the In-band I/F (118a, 118b, 118c) is a command device, a logical unit number LUN is offered or when the In-band I/F (118a, 118b, 118c) is a specified port, an IP address for specifying the port is offered. For offering, the custodian may distribute the listed information from the management server 116 to the host 101 used by each user 1101, 1102 or 1103 through the medium of the network or each user 1101, 1102 or 1103 may acquire the listed information by accessing the management server 116 through the use of a specified authentication method.

On the basis of the information obtained in this manner, the users 1101, 1102 and 1103 select logical groups 110, 120 and 130 meeting their intentions and inform the custodian of management server 116 of the use of the selected logical groups 110, 120 and 130. After the notification, the users use (operate) the selected logical groups 110, 120 and 130 by using the corresponding In-band I/F (118a, 118b, 118c). The aforementioned listed information may simply include only information concerning the kinds of logical groups 110, 120 and 130. In this case, a mode may be employed in which the users 1101, 1102 and 1103 may receive, directly from the management server 116 of custodian, the information specifying the In-band I/F (118a, 118b, 118c) corresponding to the logical groups 110, 120 and 130 the use of which is notified. In this mode, in respect of the logical groups 110, 120 and 130 the users 1101, 1102 and 1103 do not use, the users 1101, 1102 and 1103 cannot specify the In-band I/F (118a, 118b, 118c) corresponding to these logical groups 110, 120 and 130 and as a result, safety can more be improved.

In the foregoing embodiment, operation responsive to an access request through the In-band I/F has been described. But, this is not limitative and the embodiment of this invention can also be applicable, as will be described below, to the case where the management server 116, for instance, makes a request for access to the storage controller 112 through the management terminal unit 113 by way of an Out of Band I/F representing a route different from that for ordinary data read and write.

Figure 18:
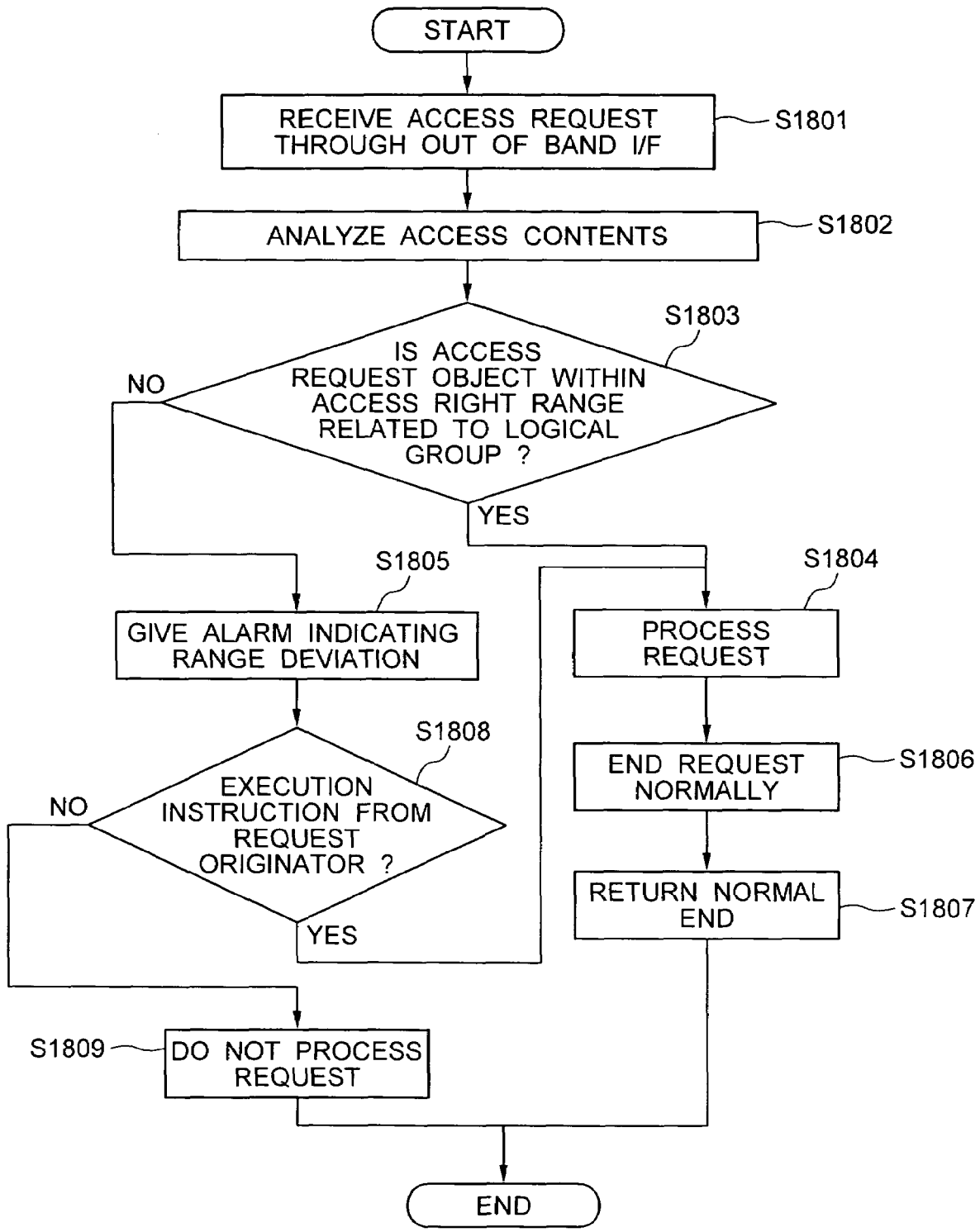
FIG. 18 is a flowchart of an access decision process when an access request through an Out of Band I/F is received in the storage controller.

FIG. 18 is a flowchart of a process for access decision when an access request is received through the Out of Band I/F in the storage controller.

Figure 19:
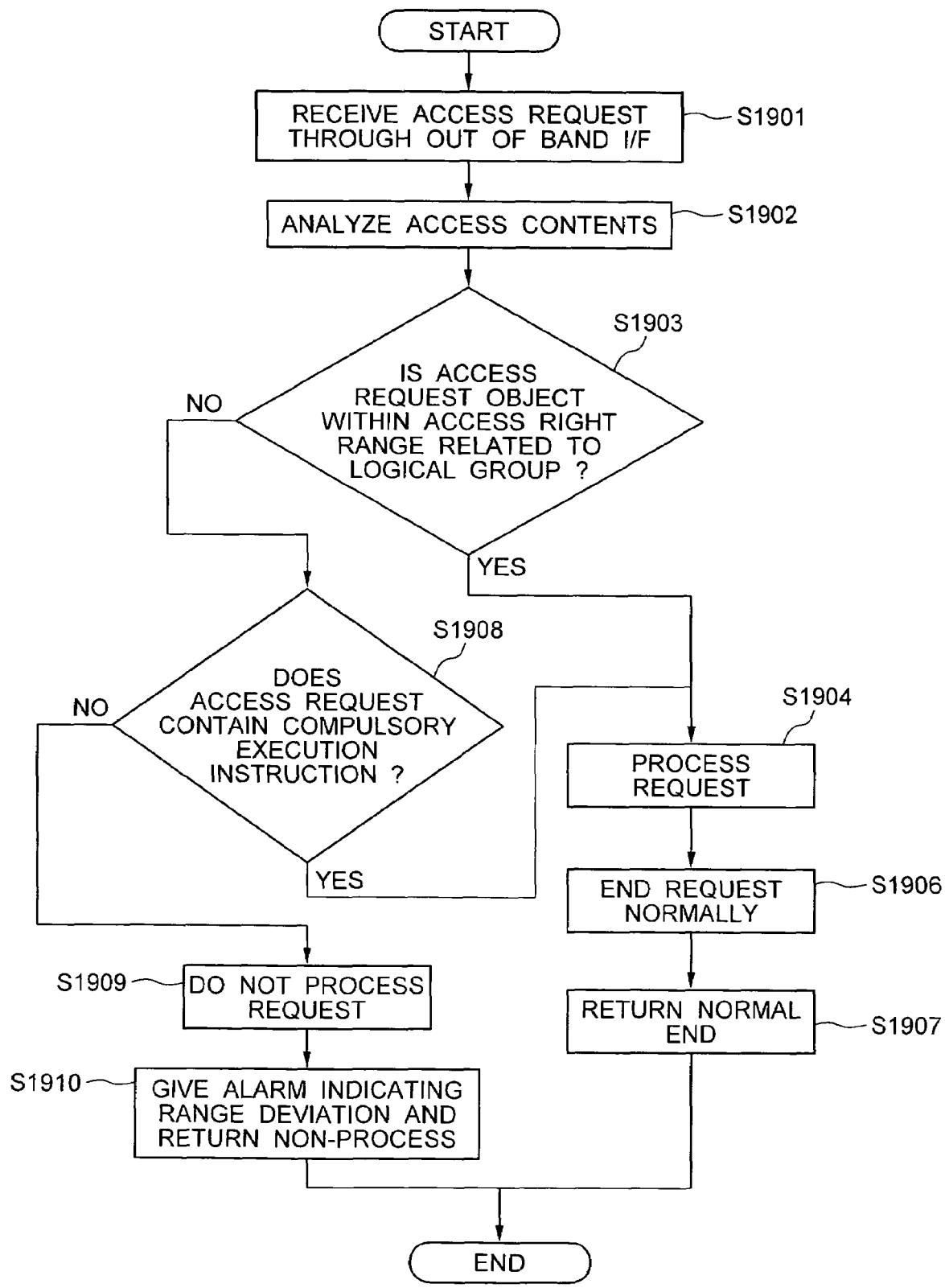
FIG. 19 is a flowchart of another process of access decision process when an access request through the Out of Band I/F is received in the storage controller.

FIG. 19 is a flowchart of another process for access decision when an access request is received through the Out of Band I/F in the storage controller.

FIG. 18 or 19 shows an example of an operational flow of an access request via such an I/F provided in, for example, the management terminal unit 113 shown in FIG. 11 and employed as the Out of Band I/F.

More particularly, in contrast to the access through the foregoing In-band I/F, the access via the Out of Band I/F lacks information about a group to which the Out of Band I/F belongs and therefore, in deciding an access request by means of the storage controller 112, the storage controller 112 decides only a condition as to whether an object to be accessed is a resource or resources within the range of a group of interest (for example, whether an object volume is within the range of the group of interest).

To decide whether the contents of an access request coincides with functions allotted to the designated logical group 110, 120 or 130, the following two methods are conceivable.

In the first method, information such as functions allotted to the logical groups 110, 120 and 130 is managed in the management terminal unit 113 representing the Out of Band I/F. Then, the management terminal unit 113 analyzes the contents of a received access request to decide whether a process of the access request needs to be executed.

In the second method, the storage controller 112 manages persistently information of the logical groups 110, 120 and 130. The management terminal unit 113 receiving an access request transmits information of the access request to the storage controller 112 and inquires of it about permissibility/impermissibility of the access request. The storage controller 112 receiving the inquiry decides on the basis of the information of the logical groups 110, 120 and 130 whether the process of access request is permissible and transmits a result of decision to the management terminal unit 113. The management terminal unit 113 receiving the result transmits it to a host 101 which has transmitted the access request. An example of the former will be described with reference to FIG. 18.

The process flowchart shown in FIG. 18 shows a flow in an assumptive access mode in which when the result of access request decision by the storage controller 112 indicates that an object volume is not in the range of the same logical group, the storage controller 112 interactively gives the alarm of deviated range to an access request originator and waits for an instruction thereto from the access request originator.

The flowchart shown in FIG. 19 shows a flow in which information for instructing the storage controller 112 to perform an operation in the case of range deviation precedently exists in an access request, so that the storage controller 112 automatically returns the alarm in accordance with the information and decides whether the access is rejected or whether the access request is executed compulsorily on the storage controller side.

Firstly, making reference to the FIG. 18 flowchart, a process when an access request through Out of Band I/F is received will be described. In FIG. 18, the storage controller 112 first receives an access request (step S1801). Next, the storage controller 112 analyzes the contents of the access (step S1802). In this phase, the storage controller 112 decides, on the basis of, for example, the information of defined as shown in FIG. 6, whether an access object is a resource in the range of a group of interest (for example, whether an object volume indicated at 602 is in the range of a group of interest indicated at 604) and is within the influence range of right, that is, whether the object subject to the access request is within the range of the access right related to the logical group (step S1803).

If in this decision step S1803 the object of access request is not within the access right related to the logical group, the storage controller 112 gives the alarm to the effect that the object of access request deviates from the range of the same logical group (step S1805). On the other hand, if in the decision step S1803 the storage controller 112 determines that the object of access request is within the range of access right related to the logical group, the storage controller 112 proceeds with the access request (step S1804), confirms the normal end of the request (step S1806) and notifies the end of the process (step S1807).

Thereafter, in the step S1805, it is decided whether an execution instruction is issued from the request originator in response to the alarm given by the storage controller 112 (step S1808). When the instruction from the request originator is for execution, the program proceeds to the step S1804 and the storage controller 1012 executes the access request process. If in the decision step S1808 no execution instruction is issued from the request originator, the storage controller 112 does not carry out the process and ends the program (step S1809).

Next, with reference to FIG. 19, another example of access decision process when an access request through Out of Band I/F is received in the storage controller will be described. In FIG. 19, the storage controller 112 first receives an access request through the Out of Band I/F (step S1901). Subsequently, the storage controller 112 analyzes the contents of the access (step S1902). In this phase, the storage controller 112 decides, on the basis of the information of defined as shown in, for example, FIG. 6 in the storage controller, whether an object the storage controller 112 accesses is a resource within the range of a group of interest (for example, whether the an object volume is in the range of the group of interest) and is within the right influence range, that is, whether the object of access request is within the access right range related to the logical group (step S1903).

If in this decision step S1903 the access request object is determined not to be in the range of access right related to the logical group, the storage controller 112 decides whether the request originator instructs the access request of interest to be executed compulsorily (step S1908). On the other hand, when in the decision step S1903 the storage controller 112 determines that the access request object is within the range of access right related to the logical group, the storage controller 112 carries out an a process of access request (step S1904), confirms the normal end of the request (step S1906) and notifies the end of the process (step S1907).

If in the decision step S1908 the instruction from the access request originator includes a forcible execution instruction, the program proceeds to the step S1904 and the storage controller 112 executes a process in the steps S1904, S1906 and S1907. Contrarily, when in the decision step S1908 the instruction from the request originator does not include a forcible execution, the storage controller 112 concludes that the access request process is not to be executed (step S1909), gives the alarm to the effect that the range of access right deviates and informs the access request originator that the process does not proceed, thus ending all of the processes (step S1910).

As a concrete example shown in the flowchart in FIG. 18, an instance is conceivable in which a user (custodian) first makes an access request as shown in FIG. 20 through the Out of Band I/F to the storage controller 112 by way of the management server 116. Here, the contents of the access is such that the local copy function of storage function at access type 2003 is used to perform an operation at operation 2004 to make a logical volume at 2005 related to a logical volume at 2006 in the copy pair relationship having redundancy.

At that time, according to the flow in FIG. 18, the storage controller 112 first analyzes the requested access in the step S1802 to determine that the request is an access as shown in FIG. 20. Objects subjected to copy pair are Channel ID #1, Host Group ID#2 and volume of LUN"#0 (for example, volume ID#2 in FIG. 6) of a logical volume at 2005 and Channel ID#2, Host Group ID#3 and volume of LUN #0 (for example, volume ID#5 in FIG. 6) of a logical volume at 2006.

According to a table of logical groups to which volumes belong (for example, the FIG. 6 table), these volumes belong to different logical groups (volume ID#2 belonging to 000 and volume ID#5 belonging to 001) and the access request object is determined not to be coincident with the logical group in the step S1803 and then the storage controller 112 gives the alarm to the effect that the access request object deviates from the range of the same logical group. This alarm may be a message to be displayed on the screen of a terminal operated by the user (custodian). Thereafter, concurrently with the issuance of the alarm, the management terminal 113 of storage controller 112 is started to be placed in condition of awaiting an instruction for continuation of process from the request originator (step S1808) and upon reception of the continuation instruction from the request originator, a response of rejection is returned to end the program. In this manner, even when the user (custodian) operates erroneously to make a volume belonging to quite a different logical group of the storage controller 112 an operation object, the storage controller 112 can prevent unrelated data from being extinguished erroneously. Further, the storage controller 112 can reject, in a similar way, an access request maliciously aiming at data destruction.

The alarm process in the embodiment of access through the Out of Band I/F as shown in FIG. 18 or 19 can obviously be applied to the access request in the In-band I/F explained in connection with the first embodiment in a similar way.

While in the foregoing embodiments, the subject in each process has been simply described as being the storage controller 112, this is not limitative in the present invention and the processor unit 106 or the management terminal 113 may be the subject in each process. Alternatively, a process functional unit dedicated to the subject in each process may be provided.

According to the present embodiment set forth so far, in connection with not only an access request through the In-band I/F but also an access request through the Out of band I/F, the storage controller 112 can reject a divisional logical group which is out of the access right range to prevent operational error and data destruction due to illegal access.

With the present invention, the information managed in the storage controller can be simplified and even when a plurality of storage controllers are managed on the management server side, information of the server, user and application utilized thereby can be managed concentrically on the management server side. Through this, even when there are a plurality of storage controllers, the storage controller can be flexible and can simplify access control management and an information system including the storage controllers can be provided.

Further, according to this invention, among a plurality of logical storage controllers, secure access can be provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising;
a host computer;
a storage system, which includes a storage controller connected to the host computer; and
a management computer connected to the host computer and to said storage system,
wherein said storage system comprises:
at least one interface unit to be coupled to the host computer;
a plurality of disk units configured to form a plurality of logical volumes;
at least one processor coupled to interface unit and adapted to control access between the host computer and at least one of the disk units; and
at least one memory unit adapted to hold write data and read data sent from the host computer and read from at least one of the disk units; and,
wherein the memory unit is adapted to store management information indicating that the logical volumes are logically divided into a plurality of logical groups by the logical volumes, the processor, the interface unit and the memory unit, structural information indicating the logical volume and the logically divided partitions of the processor, its throughput, the interface unit, its available function and an allotment rate of bandwidth of an internal network, belonging to each of the logical group, and to store control information indicating whether a copy operation is allowed or not for each of the logical groups responsive to a copy request from the host computer,
wherein the processor is adapted to analyze contents of access regarding the structural information and the control information and to determine permissibility or impermissibility of the copy request on the basis of both a specific nature of the copy operation and the specified logical group in the copy request and the control information to thereby maintain security between said logical groups.

2. A system according to claim 1,
wherein the storage system is adapted to set the one or a plurality logical groups meeting a required performance.

3. A system according to claim 2,
wherein the management computer is adapted to transmit information concerning an interface of the one or a plurality of said logical groups to the host computer, and
wherein on the basis of the information concerning the interface, the host computer is adapted to transmit the copy request to the storage system.

4. A storage system comprising:
at least one interface unit to be coupled to at least one computer;
a plurality of disk units configured to form a plurality of logical volumes;
at least one processor coupled to the interface unit and adapted to control access between the computer and at least one of the disk units; and at least one memory unit adapted to hold write data and read data sent from the computer and read from at least one of the disk units; and wherein the memory unit is adapted to store management information indicating that the logical volumes are logically divided into a plurality of logical groups by the logical volumes, the processor, the interface unit and the memory unit, management information indicating that the logical volumes are logically divided into a plurality of logical groups by the logical volumes, the processor, the interface unit and the memory unit, structural information indicating the logical volume, and the logically divided partitions of the processor, its throughput, the interface unit, its available function and an allotment rate of bandwidth of an internal network, belonging to each of the logical groups, and to store control information indicating whether a copy operation is allowed or not for each of the logical groups responsive to a copy request from the computer, wherein the processor is adapted to analyze contents of access regarding the structural information and the control information and to determine permissibility or impermissibility of the copy request on the basis of both specific nature of the copy operation and a specified logical volume in the request and the control information to thereby maintain security between said logical groups.

5. A storage system according to claim 4, wherein the interface unit is adapted to utilize an In-band I/F (Interface) for transferring a command.

6. A storage system according to claim 4, wherein correspondence relation information is stored in said memory by way of a management computer for management connected to the storage system.

7. A storage system according to claim 4, wherein predetermined information is stored in said memory which includes information of performance required of said one or plurality of logical groups.

8. A storage system according to claim 7, wherein said processor is adapted to set said one or plurality of logical groups meeting said required performance in said storage system.

9. A storage system according to claim 4, wherein the copy operations include at least one operation of local copy, remote copy, LUN WORM (Logical Unit Number-Write once Read Only Medium), and external copy.

10. A storage system according to claim 4, wherein the specified copy operation is related to replication of data between the logical volumes.

11. A storage system according to claim 10, wherein the copy request includes information about two of the logical volumes for replication to be executed between the two logical volumes.

12. A storage system according to claim 11, wherein:

the two logical volumes are related to different logical groups;

the processor is adapted to determine permissibility or impermissibility for both logical groups; and the processor is adapted to execute the operation if the operation is allowed for the both logical volumes on the basis of the control information.

* * * * *